United States Patent
Sinha (10) Patent No.: US 11,252,200 B2
(45) Date of Patent: Feb. 15, 2022

(54) APPARATUS AND METHOD FOR P-CSCF FAILURE DETECTION AND PROCESSING

(71) Applicant: Charter Communications Operating, LLC, St. Louis, MO (US)

(72) Inventor: Ashutosh Kumar Sinha, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 63 days.

(21) Appl. No.: 16/394,911

(22) Filed: Apr. 25, 2019

(65) Prior Publication Data

US 2020/0344273 A1 Oct. 29, 2020

(51) Int. Cl.
*H04L 29/06* (2006.01)
*H04L 29/14* (2006.01)

(52) U.S. Cl.
CPC ........ *H04L 65/105* (2013.01); *H04L 65/1006* (2013.01); *H04L 65/1016* (2013.01); *H04L 65/1073* (2013.01); *H04L 69/28* (2013.01); *H04L 69/40* (2013.01)

(58) Field of Classification Search
CPC ... H04L 65/105; H04L 65/1016; H04L 69/40; H04L 65/1006; H04L 65/1073; H04L 69/28
See application file for complete search history.

(56) References Cited

U.S. PATENT DOCUMENTS

| 2008/0056234 A1* | 3/2008 | Sprague | H04L 65/105 370/352 |
|---|---|---|---|
| 2008/0144605 A1* | 6/2008 | Qiu | H04M 7/0084 370/352 |
| 2009/0097398 A1* | 4/2009 | Belinchon Vergara | H04L 69/40 370/216 |
| 2010/0142372 A1* | 6/2010 | Boberg | H04L 69/40 370/230 |
| 2011/0128843 A1* | 6/2011 | Przybysz | H04L 43/50 370/216 |
| 2012/0042084 A1* | 2/2012 | Dutta | H04L 65/1069 709/228 |
| 2015/0121123 A1* | 4/2015 | Bath | H04L 63/08 714/4.11 |
| 2015/0124588 A1* | 5/2015 | Hallenstal | H04L 65/1016 370/221 |

(Continued)

*Primary Examiner* — Philip J Chea
*Assistant Examiner* — Wuji Chen
(74) *Attorney, Agent, or Firm* — Young Basile Hanlon & MacFarlane, P.C.

(57) ABSTRACT

Described herein are apparatus and methods for detecting and handling Proxy-Call Session Control Function (P-CSCF) failures. A method may include sending, by a serving-CSCF (S-CSCF), a message to the P-CSCF to check operability. The S-CSCF may mark in a list that the P-CSCF is unavailable if a negative response or no response is received from the P-CSCF and may set a timer to recheck availability of the unavailable P-CSCF. A message is sent by the S-CSCF to a device management system to force a user device to stop using the unavailable P-CSCF and register with a different P-CSCF. The S-CSCF may recheck availability of the unavailable P-CSCF upon expiration of the timer and may remove the unavailable P-CSCF from the list when a positive response is received from the unavailable P-CSCF.

20 Claims, 7 Drawing Sheets

(56) References Cited

U.S. PATENT DOCUMENTS

| | | | | |
|---|---|---|---|---|
| 2016/0127426 A1* | 5/2016 | Kalepu | ............... | H04L 65/1073 |
| | | | | 370/328 |
| 2016/0249401 A1* | 8/2016 | Tanaka | .................... | H04M 3/00 |
| 2018/0007612 A1* | 1/2018 | Jahangir | ............... | H04W 8/005 |
| 2020/0344273 A1* | 10/2020 | Sinha | ................... | H04L 65/105 |
| 2021/0044629 A1* | 2/2021 | Hallenstal | ........... | H04L 61/6095 |
| 2021/0266349 A1* | 8/2021 | Foti | .................... | H04L 65/1069 |

* cited by examiner

APPARATUS AND METHOD FOR P-CSCF FAILURE DETECTION AND PROCESSING

TECHNICAL FIELD

This disclosure relates to IP Multimedia Services (IMS) networks. More specifically, this disclosure relates to detecting and handling Proxy-Call Session Control Function (P-CSCF) failures.

BACKGROUND

Voice over Internet Protocol (VoIP) calls may be made using cable networks and like systems and are facilitated using IP Multimedia Services (IMS) networks. The IMS networks support a wide range of IP-based multimedia applications and services enabled by the flexibility of Session Initiation Protocol (SIP) messaging. It facilitates communication across different networks, including fixed and mobile networks to support the market demand for multiple device types. In fixed networks, such as the cable networks, there is no mechanism for detecting a Proxy-Call Session Control Function (P-CSCF) failure. The P-CSCF is the initial point of contact and the control point for the user equipment (UE) within the IMS network from the access side. If a UE attempts to make a call, and detects that the P-CSCF is down, the inbound call may fail since the UE handles failure processing including the selection of another P-CSCF (which means waiting until registration refresh or new call initiation).

SUMMARY

Disclosed herein are apparatus and methods for detecting and handling Proxy-Call Session Control Function (P-CSCF) failures. A method may include sending, by a serving-CSCF (S-CSCF), a message to the P-CSCF to check operability. The S-CSCF may mark in a list that the P-CSCF is unavailable if a negative response or no response is received from the P-CSCF and may set a timer to recheck availability of the unavailable P-CSCF. A message is sent by the S-CSCF to a device management system to force a user device to reset from using the unavailable P-CSCF to a different P-CSCF. The S-CSCF may recheck availability of the unavailable P-CSCF upon expiration of the timer and may remove the unavailable P-CSCF from the list when a positive response is received from the unavailable P-CSCF.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices and systems for detecting and handling Proxy-Call Session Control Function (P-CSCF) failures. A mechanism is provided for proactively determining a status of a P-CSCF and if the P-CSCF is down, failover to another P-CSCF. The mechanism may improve user experience, reduce call failures due to P-CSCF issues and provide enhanced operability.

In an implementation, a Serving-Call Session Control Function (S-CSCF) may detect a P-CSCF failure and handle the situation in a proactive manner. For example, the S-CSCF may assist in failover to another P-CSCF. The S-CSCF may detect the P-CSCF failure early by checking the status of the P-CSCF on a periodic basis. Consequently, the number of failed calls due to P-CSCF failure may decrease.

In an implementation, a S-CSCF may gain information about P-CSCF availability by sending messages to the P-CSCF. The messages may be sent at a defined periodicity. The defined periodicity may be configured based on several factors including, but not limited to, number of available P-CSCFs, frequency of failures, frequency of inbound calls and the like. If the S-CSCF receives a negative response or no response from the P-CSCF, the S-CSCF may mark this P-CSCF as down, unavailable, or failed in an isolation list and set an isolation timer. The isolation timer may be a defined period of time which may be configurable based on several factors including, but not limited to, number of available P-CSCFs, frequency of failures, frequency of inbound calls and the like. The S-CSCF may then inform a device management system of the failure of the P-CSCF. The device management system may then force all devices which are registered through the failed P-CSCF to reset and register with a different P-CSCF. In an implementation, the S-CSCF may check availability of the failed P-CSCF upon expiration of the isolation timer.

In an implementation, a S-CSCF may gain information about P-CSCF availability by sending SIP OPTIONS messages to the P-CSCF at defined intervals (which may be configurable based on available P-CSCFs, frequency of failures, frequency of inbound calls and the like). Failed P-CSCFs are taken offline and a reset timer is set. The S-CSCF may send a Hypertext Transfer Protocol (HTTP) request message to a device management system, which in turn registers devices from the failed P-CSCF to a different P-CSCF. In an implementation, The S-CSCF may check the status of the failed P-CSCF upon the earlier expiration of the reset timer for the failed P-CSCF or at the expiry of the defined interval.

Figure 1:
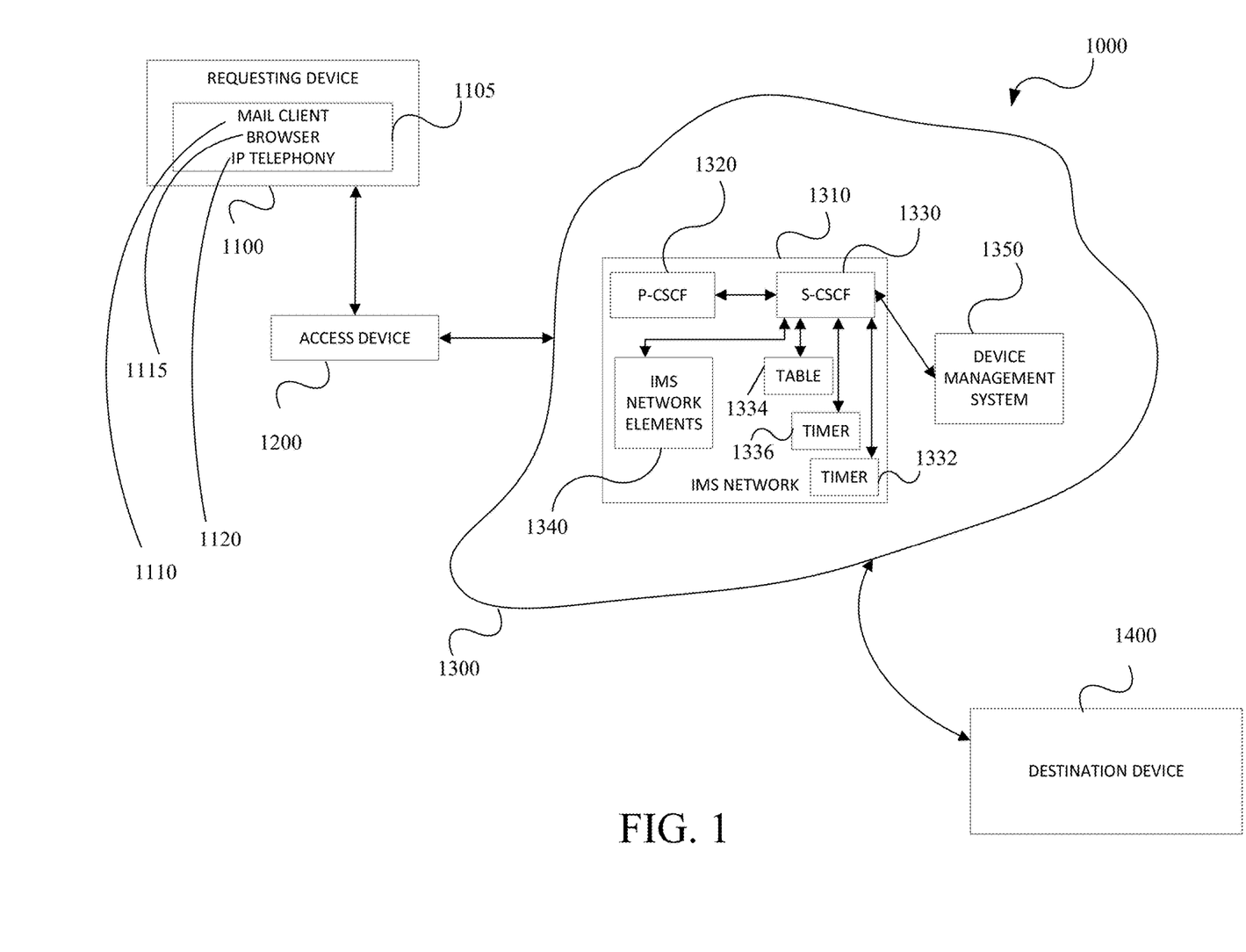
FIG. 1 is a diagram of an example architecture for Internet Protocol (IP) based calls in accordance with embodiments of this disclosure.

FIG. 1 is a diagram of an example architecture 1000 using an IP Multimedia Services (IMS) network 1310 in accordance with embodiments of this disclosure. In an implementation, the architecture 1000 may include a requesting device 1100 connected to or in communication with (collectively "connected to") an access device 1200. In an implementation, the connection between the requesting device 1100 and the access device 1200 may be wired, wireless, and/or a combination thereof. The access device 1200 is connected to a network 1300, which in turn is connected to a destination device 1400. The network 1300 may include, but is not limited to, the IMS) network 1310 and a device management system 1350. In an illustrative example, the IMS network 1310 and the device management system 1350 may be part of a service provider system or network. The connections between the requesting device 1100, the access device 1200, the network 1300, the device management system 1350 and the destination device 1400 may be wired, wireless, and/or a combination thereof. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The requesting device 1100 may be, but is not limited to, end user devices, user equipment (UE), user termination devices, user terminals, personal computers (PCs), cellular telephones, Internet Protocol (IP) devices, computers, desktop computers, laptops, mobile devices, handheld computers, PDAs, personal media devices, smartphones, notebooks, notepads, phablets and the like. For example, in an implementation, the requesting device 1100 may include applications such as, but not limited to, a mail application 1110, a web browser application 1115, an IP telephony application 1120 and the like.

The access device 1200 may be, but is not limited to, a router, modem, cable modem, set top box, Internet Service Provider (ISP) system device, access point device, network devices, gateway, and the like which provides access to the network 1300.

The network 1300 may be, but is not limited to, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), the IMS network 1310, a Voice over Internet Protocol (VoIP) network, and like including any combinations thereof. In an implementation, the network 1300 may contain one or more servers, network elements or devices, and the like.

The IMS network 1310 may include, but is not limited to, a P-CSCF 1320, a S-CSCF 1330, and other IMS network elements 1340. The connections between the P-CSCF 1320, the S-CSCF 1330, and the other IMS network elements 1340 may be wired, wireless, and/or combinations thereof. Each of the P-CSCF 1320, the S-CSCF 1330, and the other IMS network elements 1340 may be, but are not limited to, servers, computing devices, computers, distributive computing platforms, and the like. The P-CSCF 1320 is the initial point of contact and the control point for the requesting device 1100 within the IMS network 1300 from the access side. The S-CSCF 1330 performs registration and session control for the requesting device 1100. It is also responsible for routing SIP messages and interacting with the other IMS network elements 1340 as appropriate and applicable.

The device management system 1350 may provide services to the requesting device 1100 including, but not limited to, software and hardware configuration to permit access to data repositories, and/or grant authorization to systems, network applications and databases. The device management system 1350 may be part of the service provider system or service provider provisioning system.

The destination device 1400 may be, but is not limited to, end user devices, user equipment (UE), user termination devices, user terminals, personal computers (PCs), cellular telephones, Internet Protocol (IP) devices, computers, desktop computers, laptops, mobile devices, handheld computers, PDAs, personal media devices, smartphones, notebooks, notepads, phablets and the like.

Operationally, the requesting device 1100 may send a connection request towards the destination device 1400 via the access device 1200 and the network 1300. When the requesting device 1100 is attached to the network 1300 and in particular, the IMS network 1310, a P-CSCF, such as P-CSCF 1320 may be assigned to the requesting device 1100. The P-CSCF 1320 may then forward the connection request to a selected S-CSCF, such as S-CSCF 1330, to serve the requesting device 1100 during an IMS registration procedure. The S-CSCF 1330 supports the signaling for call setup and supplementary services control. All incoming calls are routed to the destination device 1400 through the S-CSCF 1330. If the P-CSCF 1320 is unavailable or down (collectively "unavailable"), then the connection request may fail.

In accordance with the embodiments, connection failures may be mitigated by having the S-CSCF 1330 send status messages to P-CSCFs, such as P-CSCF 1320, to determine the P-CSCFs' availability or functional status on a proactive or on-going basis. In an implementation, the S-CSCF 1330 may check the status of the P-CSCFs on a periodic basis using a timer, such as timer 1332. In an implementation, the S-CSCF 1330 may check the status of the P-CSCFs as a part of business operations where SIP messages arriving thru the P-CSCF 1320 to the S-CSCF 1330 signifies the operability. In an implementation, the messages may be SIP messages. If the P-CSCF 1320 sends a negative response or does not respond, the S-CSCF 1330 may mark the P-CSCF 1320 as being unavailable in an unavailability table or list 1334 and may set or initiate a timer, such as timer 1336, to recheck availability. In an implementation, the unavailability table 1334 may be stored in a memory such as memory 3200 in FIG. 3. The S-CSCF 1330 may send a message to the device management system 1350, which in turn may force the requesting device 1100 to register with a different P-CSCF. In an implementation, the message to the device management system 1350 may be sent using HyperText Transfer Protocol (HTTP) and the like protocols.

When the timer 1336 expires, the S-CSCF 1330 may send another message to the currently unavailable P-CSCF 1320 to determine availability. If a positive message is received from the P-CSCF 1320, the S-CSCF 1330 removes the P-CSCF 1320 from the unavailability table 1332. In an implementation, if the P-CSCF 1320 is still unavailable, the timer 1336 may be set again. In an implementation, the S-CSCF 1330 may check the status of P-CSCF 1320 at the earlier expiration of the timer 1332 or timer 1336. The S-CSCF 1330, by using one or more of the detecting and handling P-CSCF failure techniques described with respect to FIGS. 4-7, proactively checks the status of P-CSCFs, initiates resetting and registering requesting device 1100 to another P-CSCF in the event of P-CSCF failure, and mitigates call connection failure.

Figure 2:
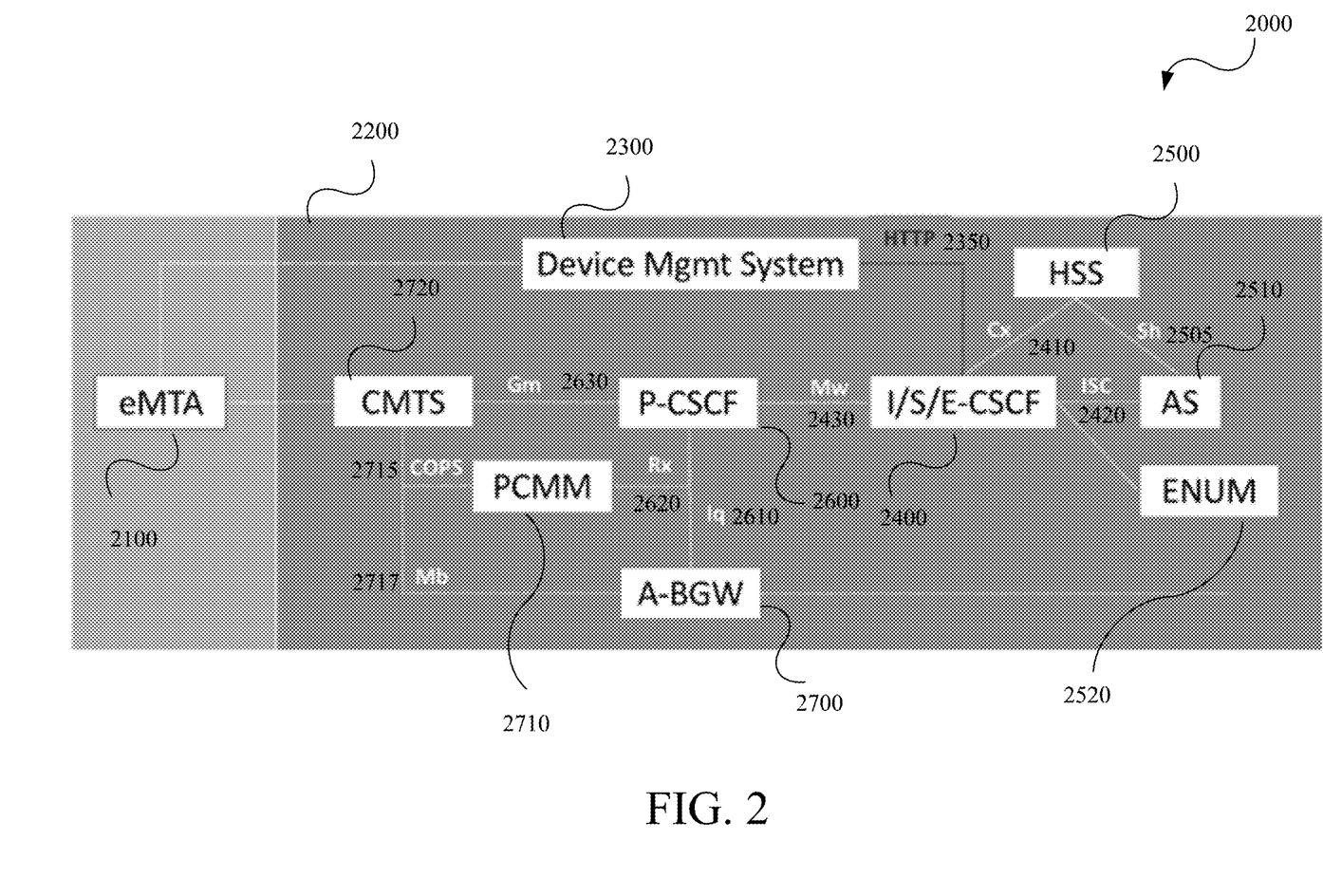
FIG. 2 is a diagram of an example architecture for Internet Protocol (IP) based calls with a cable access device in accordance with embodiments of this disclosure.

FIG. 2 is a diagram of an example service provider system and/or architecture 2000 for IP telephony in accordance with embodiments of this disclosure. In an implementation, the architecture 2000 may include an Embedded Multimedia Terminal Adapter (eMTA) 2100, which may be a combination cable modem and telephone adapter. The eMTA 2100 may be connected to a network 2200, which may be a service provider system or network. The connection between the eMTA 2100 and the network 2200 may be wired, wireless, and/or a combination thereof.

The network 2200 may include, but is not limited to, a device management system 2300 which may connected to the eMTA 2100, and a Call Session Control Function (CSCF) server(s) 2400 including, but not limited to, an Interrogating CSCF (I-CSCF), a S-CSCF, and an Emergency CSCF (E-CSCF). In an implementation, the device management system 2300 may be connected to the S-CSCF via a HTTP connection 2350. The CSCF server(s) 2400 may also be connected to a Home Subscriber Server (HSS) 2500 via a Cx connection 2410, an Application Server (AS) 2510 via an ISC connection 2420, and an ENUM server 2520. The HSS 2500 may be further connected to the AS 2510 via a Sh connection 2505.

The CSCF server(s) 2400 may be further connected to the P-CSCF server 2600 via a Mw connection 2430. In an implementation, the S-CSCF may be connected to the P-CSCF server 2600. The P-CSCF server 2600 may be further connected to an access-border gateway (A-BGW) 2700 via an Iq connection 2610, a Packet Cable MultiMedia (PCMM) server 2710 via a Rx connection 2620, and a Cable Modem Termination System (CMTS) 2720 via a Gm connection 2630. The CMTS 2720 may be further connected to the eMTA 2100, the PCMM 2710 via a COPS connection 2715, the A-BGW 2700 via a Mb connection 2717, and the eMTA 2100. The architecture 2000 is illustrative and may include additional, fewer or different devices, entities and the like which may be similarly or differently architected without departing from the scope of the specification and claims herein. Moreover, the illustrated devices may perform other functions without departing from the scope of the specification and claims herein. Each of the servers and/or network elements may be, but are not limited to, servers, computing devices, computers, distributive computing platforms, and the like.

The device management system 2300 may provide services to the requesting device 1100 including, but not limited to, software and hardware configuration to permit access to data repositories, and/or grant authorization to systems, network applications and databases. The device management system 1350 may be part of the service provider system or service provider provisioning system. The device management system 2300 may be, but is not limited to, servers, computing devices, computers, distributive computing platforms, and the like.

Operationally, a device may send a connection request towards a destination device via the eMTA 2100, which in turn forwards the connection request to the network 2200. In particular, the P-CSCF server 2600 may receive a connection request and forward the connection request to the S-CSCF to serve the device during an IMS registration procedure. The S-CSCF 1330 supports the signaling for call setup, supplementary services control, and routing of calls to the destination device. If the P-CSCF server 2600 is unavailable or down (collectively "unavailable"), then the connection request may fail.

In accordance with the embodiments, connection failures may be mitigated by having the S-CSCF send an inquiry to the P-CSCF server 2600 to determine if the P-CSCF server 2600 is operational on a proactive or on-going basis. In an implementation, the S-CSCF may check the status of the P-CSCF server 2600 on a periodic basis using a periodic timer. In an implementation, the inquiry may be sent using SIP messages. If the P-CSCF server 2600 sends a negative response or fails to respond, the S-CSCF may isolate the P-CSCF server 2600 from service. This may include updating an isolation table or list and setting an isolation timer to recheck operability. In an implementation, the isolation table may be stored in a memory such as memory 3200 in FIG. 3. The S-CSCF may send a message to the device management system 2600 via the HTTP connection 2350, which in turn may force the device to register with a different P-CSCF.

Upon expiry of the isolation timer, the S-CSCF may send another SIP message to the currently isolated P-CSCF server 2600 to determine operability. If a positive message is received from the P-CSCF server 2600, the S-CSCF marks the P-CSCF server 2600 as operational. In an implementation, if the P-CSCF server 2600 is still down, the isolation timer may be set again. In an implementation, the S-CSCF may check the status of P-CSCF server 2600 at the earlier expiration of the periodic or isolation timer.

Figure 3:
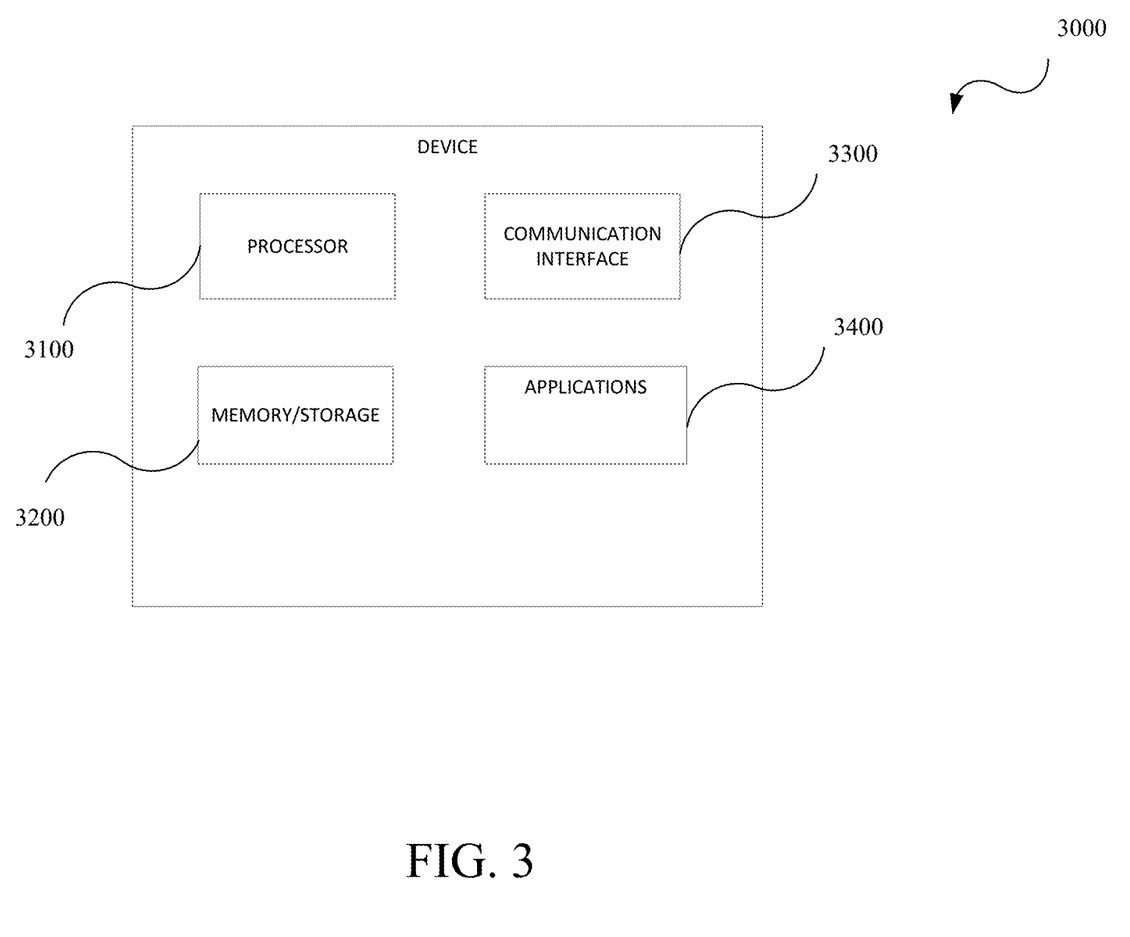
FIG. 3 is a block diagram of an example of a device in accordance with embodiments of this disclosure.

FIG. 3 is a block diagram of an example of a device 3000 in accordance with embodiments of this disclosure. The device 3000 may include, but is not limited to, a processor 3100, a memory/storage 3200, a communication interface 3300, and applications 3400. The device 3000 may include or implement, for example, the requesting device 1100, the access device 1200, the P-CSCF 1320, the S-CSCF 1330, the IMS network elements 1340, the device management system 1350 and 2300, the destination device 1400, the eMTA 2100, the HSS 2500, the CSCFs 2400, the AS 2510, the ENUM 2520, the P-CSCF server 2600, the A-BGW 2700, the PCNN 2710 and the CMTS 2720, for example. In an implementation, the memory/storage 2200 may store the table 1334. The detecting and handling P-CSCF failure techniques or methods described herein may be stored in the memory/storage 3200 and executed by the processor 3100 in cooperation with the memory/storage 3200, the communications interface 3300, and applications 3400, as appropriate. The device 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 4:
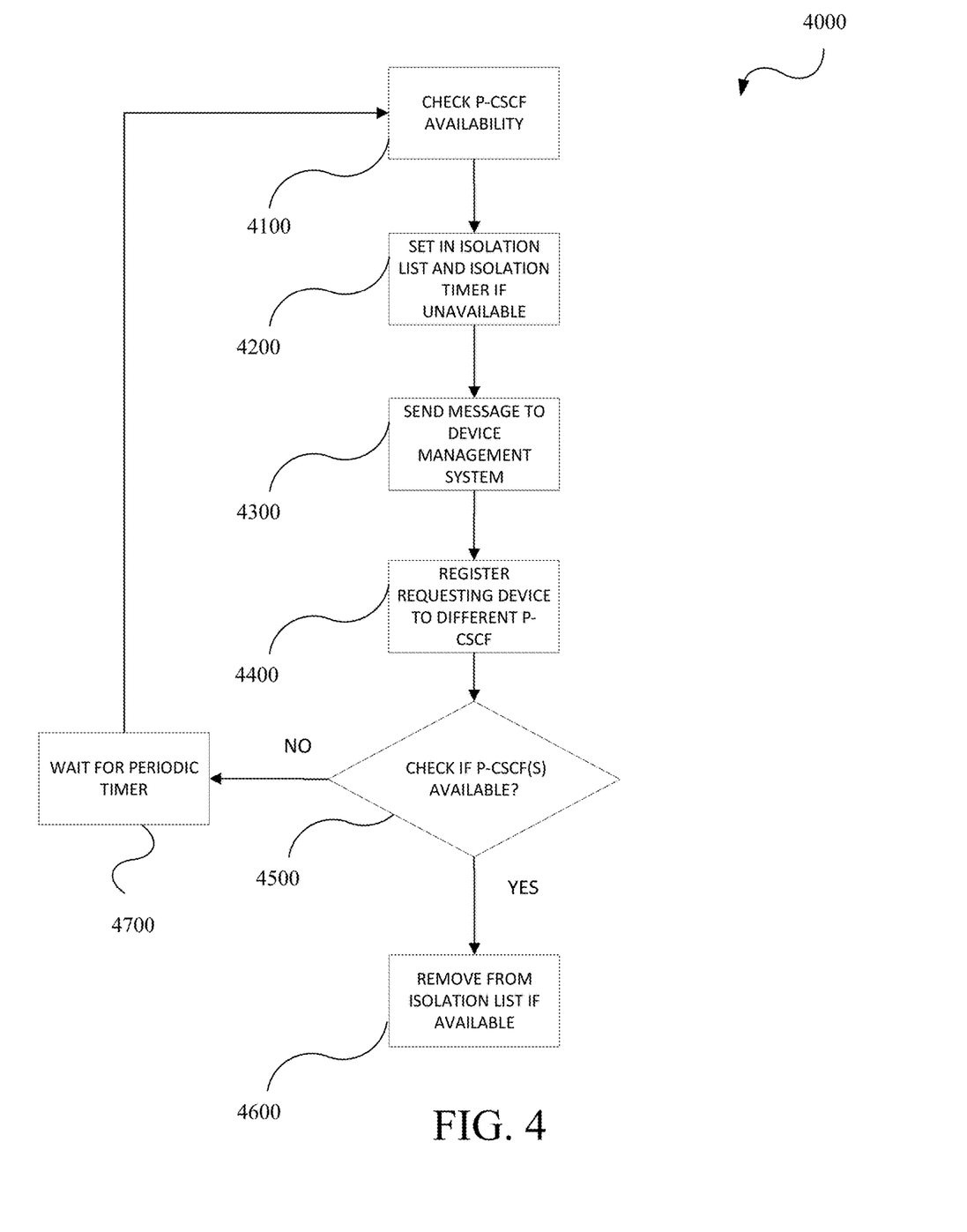
FIG. 4 is a flowchart of an example method for detecting and handling Proxy-Call Session Control Function (P-CSCF) failures in accordance with embodiments of this disclosure.

FIG. 4 is a flowchart of an example method 4000 for detecting and handling P-CSCF failures in accordance with embodiments of this disclosure. The method 4000 includes: checking 4100 the availability of a P-CSCF; setting 4200 the P-CSCF in an isolation list and setting the isolation timer when the P-CSCF is unavailable; sending 4300 a message to a device management system or device; registering 4400 requesting device(s) to different P-CSCF; checking 4500 the availability of unavailable P-CSCF(s); removing 4600 now available P-CSCF(s) from the isolation list; and waiting 4700 for expiry of periodic timer to check for availability of unavailable P-CSCF(s). For example, the technique 4000 may be implemented, as applicable and appropriate, by the requesting device 1100 of FIG. 1, the access device 1200 of FIG. 1, the P-CSCF 1320 of FIG. 1, the S-CSCF 1330 of FIG. 1, the IMS network elements 1340 of FIG. 1, the device management system 1350 of FIG. 1 and 2300 of FIG. 2, the destination device 1400 of FIG. 1, the eMTA 2100 of FIG. 2, the HSS 2500 of FIG. 2, the CSCFs 2400 of FIG. 2, the AS 2510 of FIG. 2, the ENUM 2520 of FIG. 2, the P-CSCF server 2600 of FIG. 2, the A-BGW 2700 of FIG. 2, the PCNN 2710 of FIG. 2 and the CMTS 2720 of FIG. 2, and the processor 3100 of FIG. 3.

The method 4000 includes checking 4100 the availability of a P-CSCF. In an implementation, a S-CSCF checks the availability of the P-CSCF. In an implementation, the S-CSCF checks the availability of the P-CSCF on a periodic basis. In an implementation, a periodic timer may be used. In an implementation, the period of the periodic timer may be variable and/or configurable based on factors including, but not limited to, number of available P-CSCFs, frequency of failures, frequency of inbound calls and the like. The S-CSCF may check availability by sending a message to the P-CSCF. In an implementation, the message may be a SIP OPTIONS message.

The method 4000 includes setting 4200 the P-CSCF in an isolation list and setting the isolation timer when the P-CSCF is unavailable. In an implementation, the S-CSCF may use a table stored in a memory to keep track of P-CSCFs that send negative responses or fail to send responses to the S-CSCF. In an implementation, the list may be integrated with known lists or tables which may hold P-CSCF data. In an implementation, the isolation timer may be variable and/or configurable based on factors including, but not limited to, number of available P-CSCFs, frequency of failures, frequency of inbound calls and the like.

The method 4000 includes sending 4300 a message to a device management system or device. In an implementation, the S-CSCF may send the message to the device management system. In an implementation, the message may be sent over a HTTP connection.

The method 4000 includes registering 4400 requesting device(s) to different P-CSCF. In an implementation, the device management system may force requesting devices that use or are registered with the unavailable P-CSCF, to register with a different P-CSCF.

The method 4000 includes checking 4500 the availability of unavailable P-CSCF(s). In an implementation, the S-CSCF may check the availability of unavailable P-CSCF(s) when their respective isolation timers have timed out. The S-CSCF may send a message to each such P-CSCF. In an implementation, the message may be a SIP OPTIONS message. In an implementation, the S-CSCF may check the availability of unavailable P-CSCF(s) when a periodic timer expires.

The method 4000 includes removing 4600 now available P-CSCF(s) from the isolation list. The S-CSCF may remove a P-CSCF that sends a positive response and make the P-CSCF available to requesting devices.

The method 4000 includes waiting 4700 for expiry of a periodic timer to check for availability of unavailable P-CSCF(s). For a P-CSCF with an expired isolation timer, the S-CSCF may wait for the expiration of the periodic timer to check if the still unavailable P-CSCF(s) are now available. In an implementation, the S-CSCF may check availability of P-CSCF(s) using either or both of the periodic timer and the isolation timer.

Figure 5:
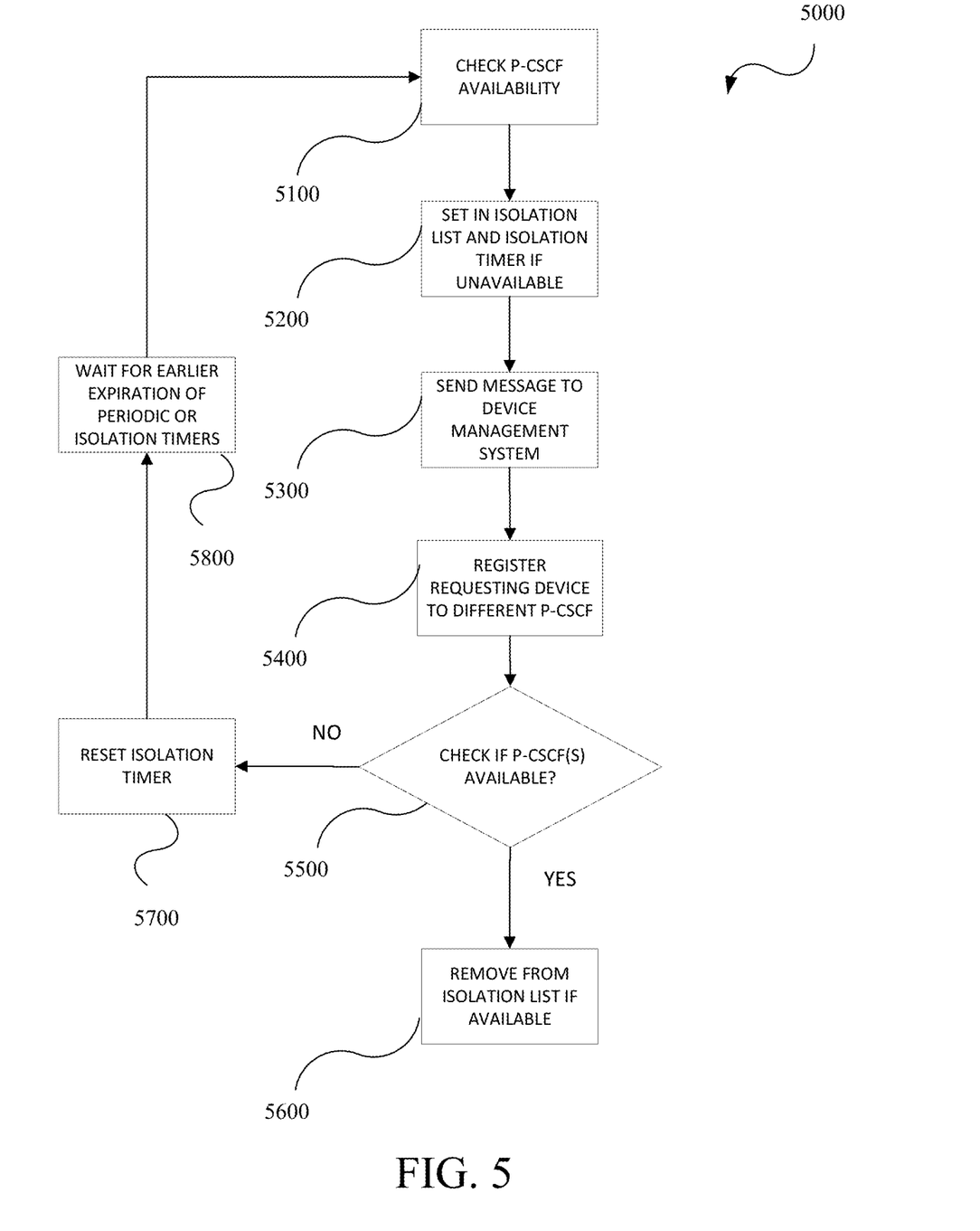
FIG. 5 is a flowchart of another example method for detecting and handling P-CSCF failures in accordance with embodiments of this disclosure.

FIG. 5 is a flowchart of an example method 5000 for detecting the status of P-CSCF(s) in accordance with embodiments of this disclosure. The method 5000 includes: checking 5100 the availability of a P-CSCF; setting 5200 the P-CSCF in an isolation list and setting an isolation timer when the P-CSCF is unavailable; sending 5300 a message to a device management system or device; registering 5400 requesting device(s) to different P-CSCF; checking 5500 the availability of unavailable P-CSCF(s); removing 5600 now available P-CSCF(s) from the isolation list; resetting 5700 the isolation timer(s) if unavailable P-CSCF(s) are still unavailable; and waiting 5800 for the earlier expiration of a periodic timer and/or isolation timer to check for availability of unavailable P-CSCF(s). For example, the technique 5000 may be implemented, as applicable and appropriate, by the requesting device 1100 of FIG. 1, the access device 1200 of FIG. 1, the P-CSCF 1320 of FIG. 1, the S-CSCF 1330 of FIG. 1, the IMS network elements 1340 of FIG. 1, the device management system 1350 of FIG. 1 and 2300 of FIG. 2, the destination device 1400 of FIG. 1, the eMTA 2100 of FIG. 2, the HSS 2500 of FIG. 2, the CSCFs 2400 of FIG. 2, the AS 2510 of FIG. 2, the ENUM 2520 of FIG. 2, the P-CSCF server 2600 of FIG. 2, the A-BGW 2700 of FIG. 2, the PCNN 2710 of FIG. 2 and the CMTS 2720 of FIG. 2, and the processor 3100 of FIG. 3.

The method 5000 includes checking 5100 the availability of a P-CSCF. In an implementation, a S-CSCF checks the availability of the P-CSCF. In an implementation, the S-CSCF checks the availability of the P-CSCF on a periodic basis. In an implementation, a periodic timer may be used. In an implementation, the period of the periodic timer may be variable and/or configurable based on factors including, but not limited to, number of available P-CSCFs, frequency of failures, frequency of inbound calls and the like. The S-CSCF may check availability by sending a message to the P-CSCF. In an implementation, the message may be a SIP OPTIONS message.

The method 5000 includes setting 5200 the P-CSCF in an isolation list and setting the isolation timer when the P-CSCF is unavailable. In an implementation, the S-CSCF may use a table stored in a memory to keep track of P-CSCFs that send negative responses or fail to send responses to the S-CSCF. In an implementation, the list may be integrated with known lists or tables which may hold P-CSCF data. In an implementation, the isolation timer may be variable and/or configurable based on factors including, but not limited to, number of available P-CSCFs, frequency of failures, frequency of inbound calls and the like.

The method 5000 includes sending 5300 a message to a device management system or device. In an implementation, the S-CSCF may send the message to the device management system. In an implementation, the message may be sent over a HTTP connection.

The method 5000 includes registering 5400 requesting device(s) to different P-CSCF. In an implementation, the device management system may force requesting devices that use or are registered with the unavailable P-CSCF, to register with a different P-CSCF.

The method 5000 includes checking 5500 the availability of unavailable P-CSCF(s). In an implementation, the S-CSCF may check the availability of unavailable P-CSCF(s) when their respective isolation timers have timed out. The S-CSCF may send a message to each such P-CSCF. In an implementation, the message may be a SIP OPTIONS message. In an implementation, the S-CSCF may check the availability of unavailable P-CSCF(s) when a periodic timer expires.

The method 5000 includes removing 5600 now available P-CSCF(s) from the isolation list. The S-CSCF may remove a P-CSCF that sends a positive response and make the P-CSCF available to requesting devices.

The method 5000 includes resetting 5700 the isolation timer(s) if unavailable P-CSCF(s) are still unavailable upon expiration of the isolation timer. The S-CSCF may reset the isolation timer for a P-CSCF that may send a negative response or is silent.

The method 5000 includes waiting 5800 for expiry of a periodic timer to check for availability of unavailable P-CSCF(s). The S-CSCF may wait for the earlier expiration of the periodic or isolation timer to check if unavailable P-CSCF(s) are now available. In an implementation, the S-CSCF may check availability of P-CSCF(s) using either or both of the periodic timer and the isolation timer.

Figure 6:
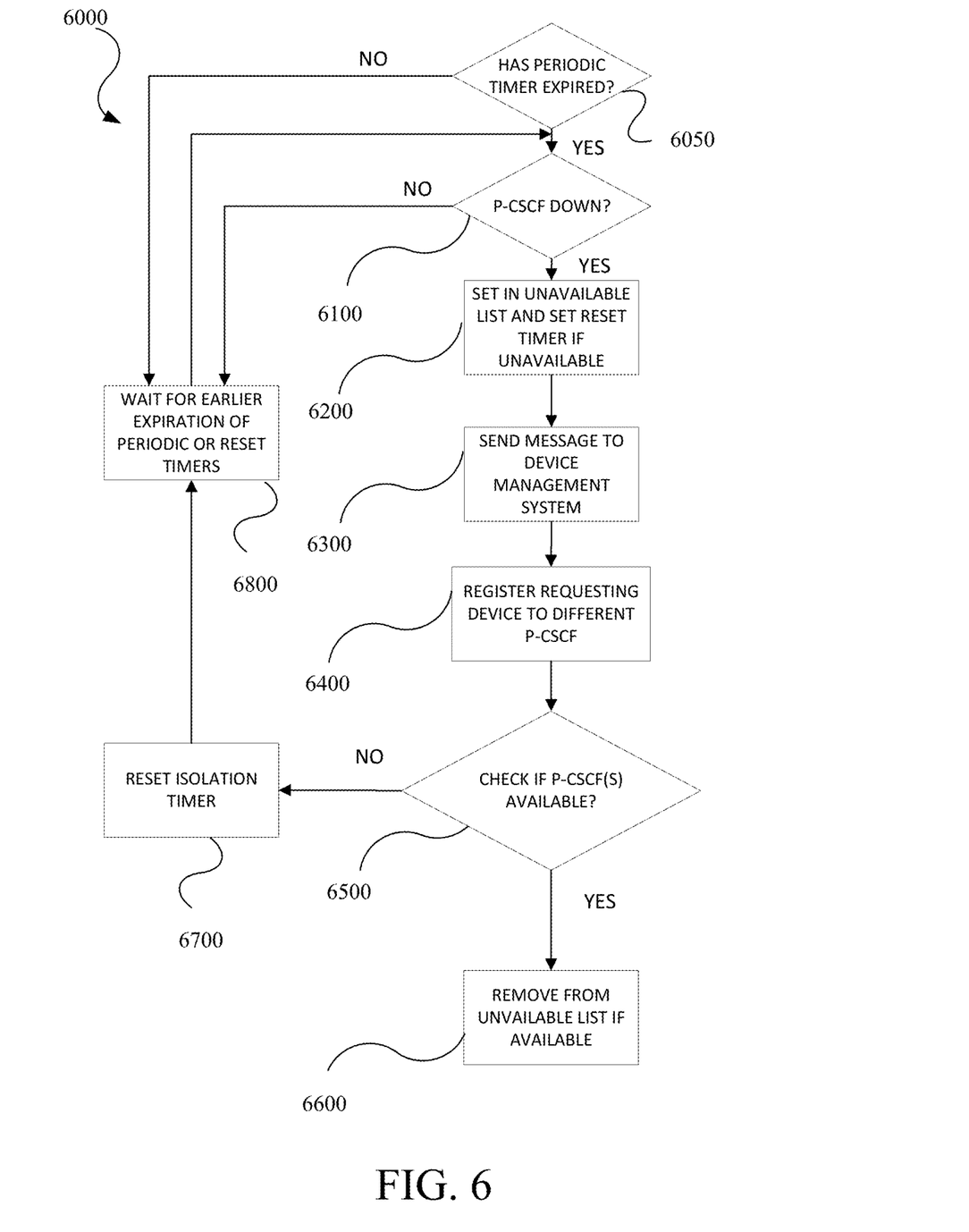
FIG. 6 is a flowchart of another example method for detecting and handling P-CSCF failures in accordance with embodiments of this disclosure.

FIG. 6 is a flowchart of an example method 6000 for detecting the status of P-CSCF(s) in accordance with embodiments of this disclosure. The method 6000 includes: checking 6050 if periodic timer has expired; checking 6100 the availability of a P-CSCF if a timer has expired; marking 6200 the P-CSCF in an unavailable list and setting a reset timer when the P-CSCF is unavailable; sending 6300 a message to a device management system or device; registering 6400 requesting device(s) to different P-CSCF; checking 6500 the availability of unavailable P-CSCF(s); removing 6600 now available P-CSCF(s) from the unavailable list; resetting 6700 the reset timer(s) if unavailable P-CSCF(s) are still unavailable; and waiting 6800 for the earlier expiration of the periodic timer and/or the reset timer to check for 1) availability of unavailable P-CSCF(s), and 2) availability of P-CSCF(s). For example, the technique 5000 may be implemented, as applicable and appropriate, by the requesting device 1100 of FIG. 1, the access device 1200 of FIG. 1, the P-CSCF 1320 of FIG. 1, the S-CSCF 1330 of FIG. 1, the IMS network elements 1340 of FIG. 1, the device management system 1350 of FIG. 1 and 2300 of FIG. 2, the destination device 1400 of FIG. 1, the eMTA 2100 of FIG. 2, the HSS 2500 of FIG. 2, the CSCFs 2400 of FIG. 2, the AS 2510 of FIG. 2, the ENUM 2520 of FIG. 2, the P-CSCF server 2600 of FIG. 2, the A-BGW 2700 of FIG. 2, the PCNN 2710 of FIG. 2 and the CMTS 2720 of FIG. 2, and the processor 3100 of FIG. 3.

The method 6000 includes checking 6050 if a periodic timer has expired. In an implementation, a periodic timer is set for a defined period. In an implementation, the defined period may be variable and/or configurable based on factors including, but not limited to, number of available P-CSCFs, frequency of failures, frequency of inbound calls and the like. In an implementation, a S-CSCF checks the availability of the P-CSCF upon expiry of the periodic timer. If the period timer has not expired, the S-CSCF may wait for the earlier of the periodic timer or a reset timer to expire as described herein.

The method 6000 includes checking 6100 the availability of a P-CSCF. In an implementation, the S-CSCF checks the availability of the P-CSCF by sending a message to the P-CSCF. In an implementation, the message may be a SIP OPTIONS message. In an implementation, if the P-CSCF is available, the S-CSCF may wait for expiration of the periodic timer to check again or wait for the expiration of a reset timer to check again with respect to an unavailable P-CSCF as described herein.

The method 6000 includes marking 6200 the P-CSCF as unavailable in a list and setting a reset timer when the P-CSCF is unavailable. In an implementation, the S-CSCF may use a table stored in a memory to keep track of P-CSCFs that send negative responses or fail to send responses to the S-CSCF. In an implementation, the list may be integrated with known lists or tables which may hold P-CSCF data. In an implementation, the reset timer may be variable and/or configurable based on factors including, but not limited to, number of available P-CSCFs, frequency of failures, frequency of inbound calls and the like.

The method 6000 includes sending 6300 a message to a device management system or device. In an implementation, the S-CSCF may send the message to the device management system. In an implementation, the message may be sent over a HTTP connection.

The method 6000 includes registering 6400 requesting device(s) to different P-CSCF. In an implementation, the device management system may force requesting devices that use or are registered with the unavailable P-CSCF(s), to register with a different P-CSCF.

The method 6000 includes checking 6500 the availability of unavailable P-CSCF(s). In an implementation, the S-CSCF may check the availability of unavailable P-CSCF(s) when their respective reset timers have timed out. The S-CSCF may send a message to each such P-CSCF. In an implementation, the message may be a SIP OPTIONS message. In an implementation, the S-CSCF may check the availability of unavailable P-CSCF(s) when a periodic timer expires.

The method 6000 includes removing 6600 now available P-CSCF(s) from the list. The S-CSCF may remove a P-CSCF that sends a positive response and make the P-CSCF available to requesting devices.

The method 6000 includes resetting 6700 the reset timer(s) if unavailable P-CSCF(s) are still unavailable when the reset timer(s) have expired. The S-CSCF may reset the reset timer for a P-CSCF that may send a negative response or is silent.

The method 6000 includes waiting 6800 for the earlier expiration of the periodic timer and/or the reset timer to check for 1) availability of unavailable P-CSCF(s), and 2) availability of P-CSCF(s). In an implementation, the S-CSCF may check availability of P-CSCF(s) using either or both of the periodic timer and the reset timer.

Figure 7:
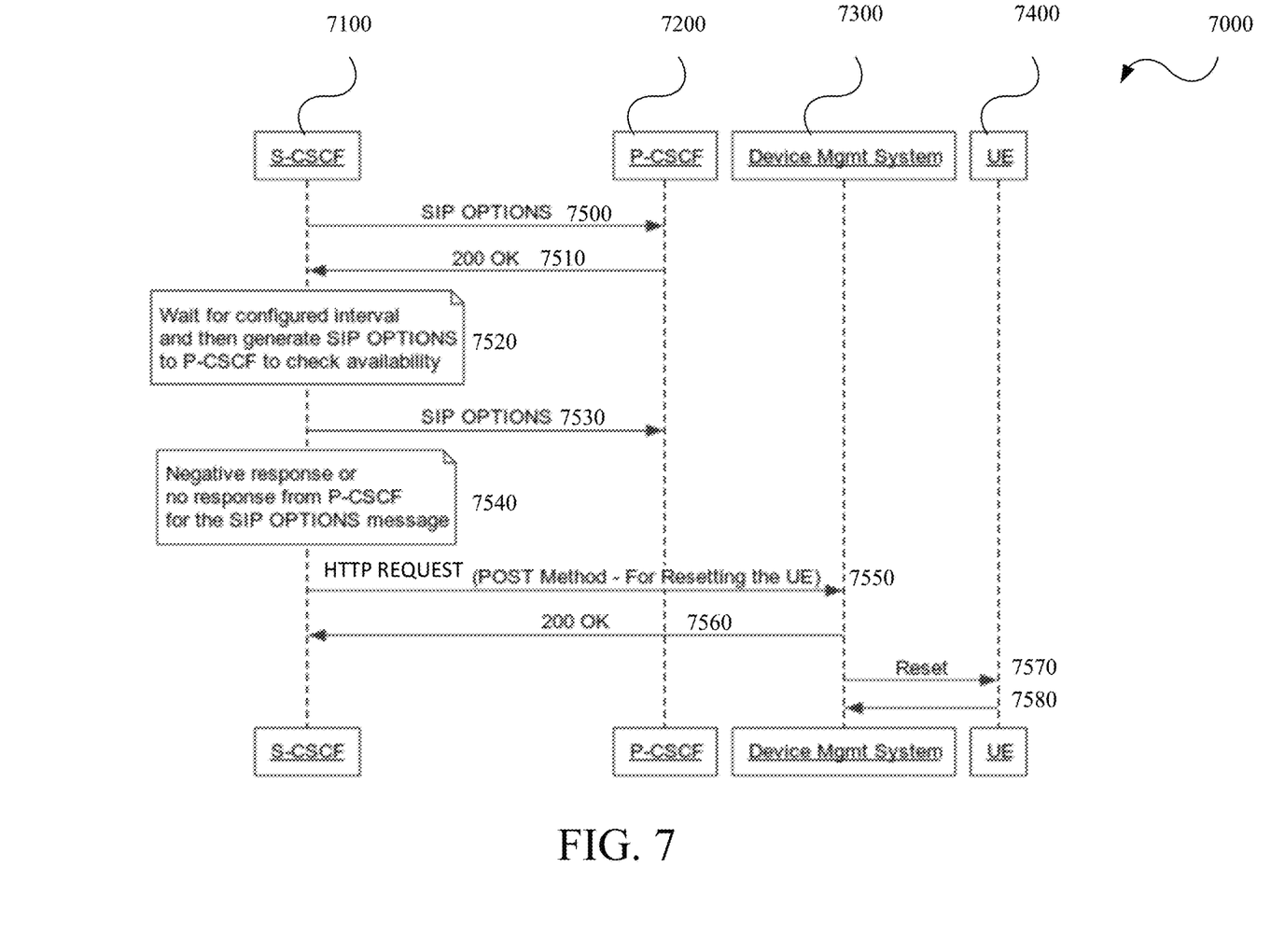
FIG. 7 is a block diagram of an example telephony architecture in accordance with embodiments of this disclosure.

FIG. 7 is a partial block diagram of an example telephony-IP Multimedia Subsystem (IMS) architecture 7000 in accordance with embodiments of this disclosure. The telephony-IMS architecture 7600 may include a S-CSCF 7100, a P-CSCF 7200, a device management system 7300 and a user equipment (UE) 7400. The telephony-IMS architecture 7000 may include other elements that are not described herein for purposes of clarity.

In accordance with the methods and techniques described herein, the S-CSCF 7100 may send a SIP OPTIONS message to check on the operability of the P-CSCF 7200 (7500). In an implementation, the P-CSCF 7200 may send a 200 OK message to indicate that the P-CSCF 7200 is functional (7510). The S-CSCF 7100 may then wait a configured interval (7520) and may then send another SIP OPTIONS message to the P-CSCF 7200 (7530). If the S-CSCF 7100 receives a negative response or no response from the P-CSCF 7200 (7540), the S-CSCF 7100 may send a HTTP Request 7550 to the device management system 7300 to reset the UE 7400 to another P-CSCF (7550). In an implementation, the S-CSCF 7100 may mark the P-CSCF 7200 as unavailable. In an implementation, the S-CSCF 7100 may initiate a timer to recheck availability of the P-CSCF 7200. The S-CSCF 7100 may receive a 200 OK message from the device management system 7300 as an acknowledgement to register the UE 7400 with another P-CSCF (7560). The device management system 7300 may send a register message to the UE 7400 (7570) and the UE 7400 may send an acknowledgement message (7580).

In general, a method for checking status of Proxy-Call Session Control Function (P-CSCF) includes sending, by a serving-CSCF (S-CSCF), a message to the P-CSCF to check operability. The S-CSCF marks in a list that the P-CSCF is unavailable if a negative response or no response is received from the P-CSCF. The S-CSCF sets a timer to recheck availability of the unavailable P-CSCF and sends to a device management system a message to force a user device to reset from the unavailable P-CSCF to a different P-CSCF. The S-CSCF checks operability of the unavailable P-CSCF upon expiry of the timer and removes the unavailable P-CSCF from the list when a positive response is received from the unavailable P-CSCF. In an implementation, the device management system sends to the user device a message to register with the different P-CSCF. In an implementation, the message to the device management system is a Hypertext Transfer Protocol (HTTP) request message. In an implementation, the S-CSCF checks if a periodic timer has expired. In an implementation, the S-CSCF checks the unavailable P-CSCF upon expiry of the periodic timer if the unavailable P-CSCF is unavailable after expiry of the timer. In an implementation, the periodic timer is configurable. In an implementation, the timer is configurable. In an implementation, the S-CSCF resets the timer if the unavailable P-CSCF is unavailable after expiry of timer. In an implementation, the S-CSCF checks the unavailable P-CSCF upon earlier expiration of the timer or the periodic timer if the unavailable P-CSCF is unavailable after expiry of the timer.

In general, a method for checking status of Proxy-Call Session Control Function (P-CSCF) includes sending, by a serving-CSCF (S-CSCF), a SIP OPTIONS message to a P-CSCF to check availability upon expiration of one of a periodic timer or a reset timer. The the S-CSCF, designates the P-CSCF as unavailable if a negative response or no response is received from the P-CSCF and sets the reset timer to recheck availability of the unavailable P-CSCF. The S-CSCF sends to a device management system a message to force a requesting device to reset from the unavailable P-CSCF to a different P-CSCF if the user device is registered with the unavailable P-CSCF. The S-CSCF restores use of the unavailable P-CSCF upon receipt of a positive response in response to a further SIP OPTIONS message. In an implementation, the device management system sends to the requesting device a message to register with the different P-CSCF. In an implementation, the message sent to the device management system is a Hypertext Transfer Protocol (HTTP) request message. In an implementation, the sending of the SIP OPTIONS message is sent upon earlier expiration of the periodic timer or the reset timer. In an implementation, the periodic timer is configurable and the reset time is configurable. In an implementation, the S-CSCF resets the timer if the unavailable P-CSCF is unavailable after expiry of timer.

In general, A system includes a device management system, a Proxy-Call Session Control Function (P-CSCF), and a serving-CSCF (S-CSCF), which is connected to the device management system and the P-CSCF. The S-CSCF is configured to send a status inquiry to the P-CSCF, isolate the P-CSCF from use if the P-CSCF provides a negative response or fails to respond, set an isolation timer with respect to the isolated P-CSCF, send a reset request message to the device management system to force user equipment using the isolated P-CSCF to another P-CSCF, and return to use the isolated P-CSCF upon receipt of a positive response in response to further status inquiries. In an implementation, the device management system is configured to send to the user equipment a registration message to register with the another P-CSCF. In an implementation, the S-CSCF is configured to check the isolated P-CSCF upon expiry of the periodic timer if the isolated P-CSCF is unavailable after expiry of the isolation timer. In an implementation, the S-CSCF is configured to reset the isolation timer if the isolated P-CSCF is unavailable after expiry of the isolation timer. In an implementation, the S-CSCF is configured to check the isolated P-CSCF upon earlier expiration of the isolation timer or the periodic timer if the unavailable P-CSCF is unavailable after expiry of the isolation timer.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for checking status of Proxy-Call Session Control Function (P-CSCF) in an IP Multimedia Subsystem (IMS) network, the method comprising:
   sending, by a serving-CSCF (S-CSCF), a message to the P-CSCF to check operability using a periodic timer;
   marking, by the S-CSCF, in a list that the P-CSCF is unavailable if a negative response or no response is received from the P-CSCF;
   setting, by the S-CSCF, a timer to recheck availability of the unavailable P-CSCF;
   sending, by the S-CSCF to a device management system, a message to force a user device to reset from the unavailable P-CSCF to a different P-CSCF when a negative response or no response is received from the P-CSCF in response to the message to the P-CSCF to check availability sent by the S-CSCF;
   checking, by the S-CSCF, operability of the unavailable P-CSCF upon earlier expiry of the timer or the periodic timer; and
   removing, by the S-CSCF, the unavailable P-CSCF from the list when a positive response is received from the unavailable P-CSCF.

2. The method of claim 1, the method further comprising:
   sending, by the device management system to the user device, a message to register with the different P-CSCF.

3. The method of claim 2, wherein the message to the device management system is a Hypertext Transfer Protocol (HTTP) request message.

4. The method of claim 2, the method further comprising:
   checking, by the S-CSCF, if the periodic timer has expired.

5. The method of claim 4, the method further comprising:
   checking, by the S-CSCF, of the unavailable P-CSCF upon expiry of the periodic timer if the unavailable P-CSCF is unavailable after expiry of the timer.

6. The method of claim 4, wherein the periodic timer is configurable.

7. The method of claim 1, wherein the timer is configurable.

8. The method of claim 1, the method further comprising:
   resetting, by the S-CSCF, the timer if the unavailable P-CSCF is unavailable after expiry of the timer.

9. The method of claim 8, the method further comprising:
   checking, by the S-CSCF, of the unavailable P-CSCF upon earlier expiration of the timer or the periodic timer if the unavailable P-CSCF is unavailable after expiry of the timer.

10. A method for checking status of Proxy-Call Session Control Function (P-CSCF), the method comprising:
    sending, by a serving-CSCF (S-CSCF), a SIP OPTIONS message to a P-CSCF to check availability upon expiration of one of a periodic timer or a reset timer;
    designating, by the S-CSCE, the P-CSCF as unavailable if a negative response or no response is received from the P-CSCF;
    setting, by the S-CSCF, the reset timer to recheck availability of the unavailable P-CSCF;
    sending, by the S-CSCF to a device management system, a message to force a requesting device to reset from the unavailable P-CSCF to a different P-CSCF if the user device is registered with the unavailable P-CSCF when a negative response or no response is received from the P-CSCF in response to the message to the P-CSCF to check availability sent by the S-CSCF; and
    restoring, by the S-CSCF, use of the unavailable P-CSCF upon receipt of a positive response in response to a further SIP OPTIONS message.

11. The method of claim 10, the method further comprising:
    sending, by the device management system to the requesting device, a message to register with the different P-CSCF.

12. The method of claim 11, wherein the message sent to the device management system is a Hypertext Transfer Protocol (HTTP) request message.

13. The method of claim 10, wherein the sending of the SIP OPTIONS message is sent upon earlier expiration of the periodic timer or the reset timer.

14. The method of claim 10, wherein the periodic timer is configurable and the reset time is configurable.

15. The method of claim 10, the method further comprising:
    resetting, by the S-CSCF, the timer if the unavailable P-CSCF is unavailable after expiry of timer.

16. A system comprising:
    a device management system;
    a Proxy-Call Session Control Function (P-CSCF); and
    a serving-CSCF (S-CSCF) connected to the device management system and the P-CSCF, the S-CSCF configured to:
    send a status inquiry to the P-CSCF;
    isolate the P-CSCF from use if the P-CSCF provides a negative response or fails to respond;
    set an isolation timer with respect to the isolated P-CSCF;

send a reset request message to the device management system to force user equipment using the isolated P-CSCF to another P-CSCF when a negative response or no response is received from the P-CSCF in response to the status inquiry to the P-CSCF sent by the S-CSCF; and return to use the isolated P-CSCF upon receipt of a positive response in response to further status inquiries, wherein the P-CSCF and the S-CSCF are one or more servers.

17. The system of claim 16, wherein the device management system is configured to:

send to the user equipment a registration message to register with the another P-CSCF.

18. The system of claim 16, wherein the S-CSCF is configured to:

check the isolated P-CSCF upon expiry of the periodic timer if the isolated P-CSCF is unavailable after expiry of the isolation timer.

19. The system of claim 16, wherein the S-CSCF is configured to:

reset the isolation timer if the isolated P-CSCF is unavailable after expiry of the isolation timer.

20. The system of claim 16, wherein the S-CSCF is configured to:

check the isolated P-CSCF upon earlier expiration of the isolation timer or the periodic timer if the unavailable P-CSCF is unavailable after expiry of the isolation timer.

* * * * *